(12) United States Patent
Malhotra

(10) Patent No.: US 6,480,531 B1
(45) Date of Patent: Nov. 12, 2002

(54) METHOD AND APPARATUS OF TESTING MODEMS IN A NETWORKING ENVIRONMENT

(75) Inventor: Pankaj Malhotra, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/178,448

(22) Filed: Oct. 23, 1998

(51) Int. Cl.[7] .................................................. H04B 1/38
(52) U.S. Cl. ..................... 375/222; 375/224; 375/228
(58) Field of Search ................................. 375/222, 224, 375/225, 228; 370/355, 356, 352, 401, 463; 714/2, 4, 25, 712, 714; 379/1.01, 32.01, 220.01, 221.01, 273, 93.01, 93.06, 93.07, 10.01

(56) References Cited

U.S. PATENT DOCUMENTS

| | | | | |
|---|---|---|---|---|
| 4,385,384 A | * | 5/1983 | Rosbury et al. ............. 375/224 |
| 4,819,235 A | * | 4/1989 | Kelly et al. ................. 375/222 |
| 4,918,722 A | | 4/1990 | Duehren et al. ............. 379/100 |
| 5,291,546 A | | 3/1994 | Giler et al. ................. 379/100 |
| 5,369,686 A | | 11/1994 | Dutra et al. ................. 379/94 |
| 5,488,651 A | | 1/1996 | Giler et al. ................. 379/100 |
| 5,594,732 A | | 1/1997 | Bell et al. .................. 370/401 |
| 5,659,542 A | | 8/1997 | Bell et al. .................. 370/496 |
| 5,712,907 A | | 1/1998 | Wegner et al. ............... 379/112 |
| 5,767,985 A | | 6/1998 | Yamamoto et al. ........... 358/402 |
| 5,805,298 A | | 9/1998 | Ho et al. .................... 358/402 |
| 5,812,278 A | | 9/1998 | Toyoda et al. ............... 358/402 |
| 5,838,683 A | | 11/1998 | Corley et al. ............... 370/408 |
| 5,838,915 A | | 11/1998 | Klausmeier et al. ... 395/200.45 |
| 5,838,994 A | | 11/1998 | Valizadeh ................... 395/876 |
| 5,859,550 A | | 1/1999 | Brandt ....................... 327/156 |
| 5,864,542 A | | 1/1999 | Gupta et al. ................ 370/257 |
| 5,867,666 A | | 2/1999 | Harvey .................. 395/200.68 |
| 5,912,888 A | * | 6/1999 | Walsh et al. ................ 370/355 |
| 6,243,832 B1 | * | 6/2001 | Eckes et al. ................. 714/33 |
| 6,249,527 B1 | * | 6/2001 | Verthein et al. ............. 370/401 |
| 6,311,291 B1 | * | 10/2001 | Barrett, Sr. et al. ......... 379/222 |

FOREIGN PATENT DOCUMENTS

WO    WO 97/18665    5/1997    ............ H04N/1/00

* cited by examiner

Primary Examiner—Chi Pham
Assistant Examiner—Khanh Cong Tran
(74) Attorney, Agent, or Firm—Law Offices of Imam

(57) ABSTRACT

A method and apparatus for use in a digital system having a plurality of modem devices from receiving de-multiplexed digital channels of information through a transmission link and providing data for use by computer equipment for detecting the presence of defective modem devices, the plurality of modem devices being organized into groups having a predetermined number of modem devices, testing each of the modems in each group against the remainder of the modems in that group, determining the number of tests that each of the modems within the group have passed successfully, selecting among the modems within each group, a 'leader' modem having the highest number of pass rate and thereafter testing the remainder of the modems in that group against the chosen 'leader' modem thereby reliably isolating defective modems from use during normal operation of the digital system.

16 Claims, 3 Drawing Sheets

METHOD AND APPARATUS OF TESTING MODEMS IN A NETWORKING ENVIRONMENT

BACKGROUND OF THE INVENTION

1. Field of the Invention

This invention relates to the field of networking systems and particularly networking systems employing a large number of modem devices.

2. Description of the Prior Art

As is commonly known, modem devices are often employed for transferring data, such as in the form of email messages, files, video and the like between various computer systems over telephone lines.

In this respect, modems are quite prevalent in networking applications for transmission and reception of data over many telephone lines or T1 communications links. In networking systems employing a large number of modems, it is crucial to ensure that when data is transferred through modems, the integrity of the data that is being transferred remains intact. Ideally, this requires detection of malfunctioning or defective modem devices prior to their usage in order to avoid inaccurate data transfers. Once defective modem devices have been identified, there needs to be a replacement of the same with modems that are operational.

One prior art method for testing that is currently in use includes back-to-back testing in which a pair of modems is selected and one of the selected pair modems is designated as the originator while the other modem is referred to as the receiver. Data is sent from the originator to the receiver in the form of twenty-six characters which are sent one at a time. Subsequently, the data that is received by the receiver is compared to the original sent data in order to determine the functionality of the modems. If the data transfer is satisfactory the pair of modems is labeled as 'good', otherwise the pair is declared defective or 'bad'.

By testing all of the modems in the system, a list of 'good' modems and a list of 'bad' modems is created. When a pair of modems is labeled as 'bad', it is not clear whether it is both modems of the pair that are defective or whether only one modem in the pair has failed. It is therefore necessary to test the modems that are included in the list of 'bad' modems against those that modems that are in the list of 'good' modems in order to identify any 'good' modems that are included in the 'bad' list. This, however, is a lengthy and time consuming process particularly where there are a large number of modems being utilized in a given system, which is commonly the case in networking environments such as the Internet.

On the other hand, it is desirable to perform extensive testing because the modems which pass rather simple tests of, for example, transferring 26 characters, may nevertheless fail if they were to undergo more elaborate testing. In other words, verification of modems using simple pass/fail tests does not necessarily yield accurate results. A modem may therefore erroneously be included in the list of 'good' modems whereas it may in fact actually be a 'bad' or defective modem.

This is especially important in the environment of a packet-switching network, such as the Internet, where an Internet Service Provider (ISP) readily depends on the reliability of modem products included within access servers. Furthermore, in systems wherein large numbers of modem products are employed, it becomes vital to perform functionality tests on modems in an expedient fashion to maintain high system performance.

Thus, in network environments employing communications products, such as modem devices, a method and apparatus is needed for reliably and expediently verifying the functionality of such communications products so as to maintain the integrity of data being transferred by the communications products thereby increasing system performance.

SUMMARY OF THE INVENTION

Briefly, a preferred embodiment of the present invention includes a method and apparatus for use in a digital system having a plurality of modem devices from receiving de-multiplexed digital channels of information through a transmission link and providing data for use by computer equipment for detecting the presence of defective modem devices, the plurality of modem devices being organized into groups having a predetermined number of modem devices, testing each of the modems in each group against the remainder of the modems in that group, determining the number of tests that each of the modems within the group have passed successfully, selecting among the modems within each group, a 'leader' modem having the highest pass rate and thereafter testing the remainder of the modems in that group against the chosen 'leader' modem thereby reliably isolating defective modems from use during normal operation of the digital system.

These and other objects and advantages of the present invention will no doubt become apparent to those skilled in the art after having read the following detailed description of the preferred embodiment illustrated in the several figures of the drawings.

IN THE DRAWING

DETAILED DESCRIPTION OF THE PREFERRED EMBODIMENTS

Figure 1:
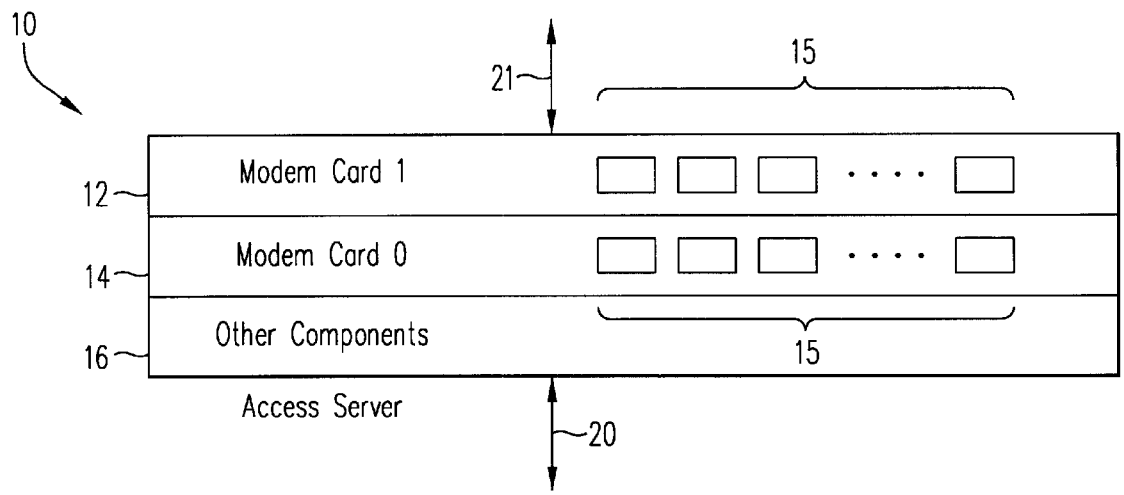
FIG. 1 shows generally in conceptual form, a digital system incorporating a preferred embodiment of the present invention including modem boards each having a plurality of modem devices undergoing testing.

Referring now to FIG. 1, a digital system 10, which may be an access server, employed in a packet-switching network environment, such as the Internet, is illustrated to include two modem circuit boards, 12 and 14, and a processing unit 16. The processing unit 16 in the embodiment of FIG. 1 is shown as a motherboard. Each of the modem boards, 12 and 14, includes a plurality of modem devices 15, which are connected to each other as well as to the motherboard 16 through components (not shown) which reside on the motherboard 16.

Modem boards 12 and 14 are coupled together through a backplane structure (not shown). The backplane structure is utilized for communication of the modem boards to the motherboard 16.

The modem devices 15, which reside on the modem boards 12 and 14 are tested by sending data in the form of a sequence of characters, or a packet of bytes, from one modem, designated as the 'originator', to another modem, designated the 'receiver'. Data that is received by a modem device is compared to the originally-generated data that is used for testing in the motherboard 16 in order to verify functionality of the pair of modems, as will be further explained below with respect to other figures. Generally, however, digital information is received from a transmission link 20 by the motherboard 16. This transmission link can take on various forms of commonly-employed communication standards, such as T1 wherein many physical lines, such as telephone lines, are multiplexed for carrying to and from telco (not shown). The transmission link 20 is coupled to the digital system 10 through the motherboard 16.

Not shown in FIG. 1 is a backplane that is used to cause coupling between all of the boards, including the modem boards 12 and 14, and the motherboard 16. Digital information received through the transmission link 20 is de-multiplexed into channels by the motherboard 16 and the de-multiplexed communication channels are then assigned by the motherboard 16 to various modem devices 15 on modem boards 12 and 14. The modem devices 15 subsequently provide data that has been extracted from the individual communications channels to various user equipment (not shown), such as Personal Computers (PCs) and the like.

In FIG. 1, the motherboard 16 includes a Central Processing Unit (CPU) (not shown), which executes programs for directing the processing of information among the modem devices. For example, at the outset of operation, or during initialization, the CPU downloads, or transfers to each modem device, a program that the modem device's Digital Signal Processor (DSP) can run to process de-multiplexed information. Additionally, the CPU assigns the modem device that is to be used for processing a given channel.

Figure 2:
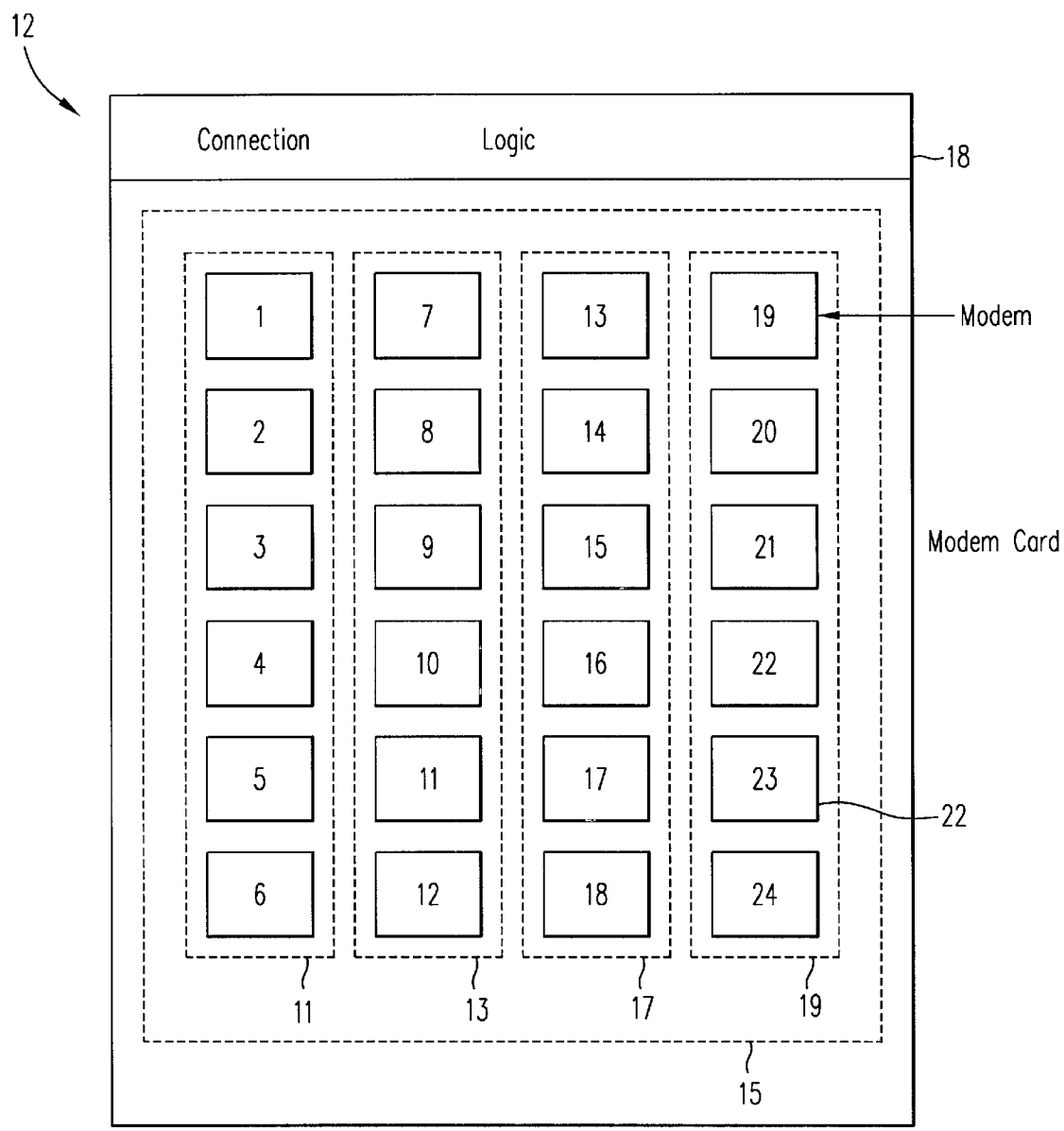
FIG. 2 shows an example of a modem board of FIG. 1 with the modem devices thereof being organized into groups in accordance with an embodiment of the present invention.

FIG. 2 shows one of the modem boards, which for the purpose of illustration is taken to be modem board 12, in greater detail. The top of the modem board 12 is shown at 18 to indicate where the modem board 12 is connected to the other boards in the system through a backplane. In FIG. 2, the plurality of modem devices 15 is shown to include 24 modem devices, one of which is indicated at 22. While in the embodiment of FIG. 2, 24 modem devices are included within the modem board 12, alternatively, a more or less number of modem devices may be similarly employed in a modem board.

In FIG. 2, the plurality of modem devices 15 are shown to be divided into four groups, 11, 13, 17 and 19, with each group having six modem devices. The division of the modem devices into groups can be done to include a different number of modem devices. Each modem device, such as 22, in one embodiment is in the form of a semiconductor device (or chip) that is commercially-available to users. An example of such a device is a TMS320 family of products manufactured by Texas Instrument, Inc.

Figure 3:
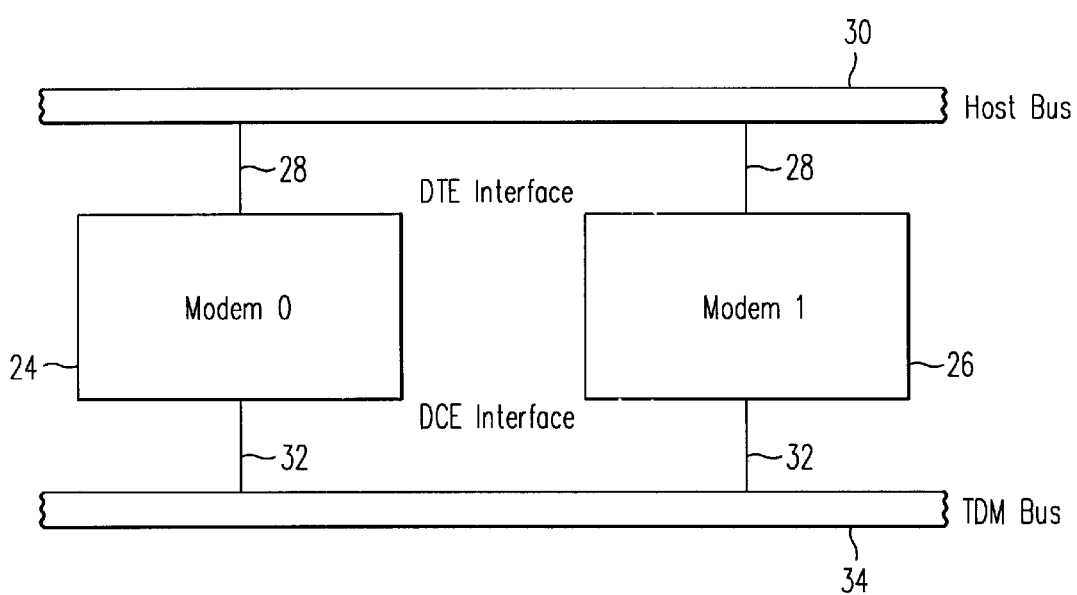
FIG. 3 depicts an example of the coupling of two of the modem devices of FIG. 2.

FIG. 3 shows the coupling between two modem devices that may reside on a modem board, such as 12 and 14 (in FIG. 1). In FIG. 3, there is shown an example of two modem devices, modem 0 at 24 and modem 1 at 26. Modems 24 and 26 are coupled to each other as well as other devices (not shown) primarily through two interfaces, a Data Terminating Equipment (DTE) interface 28 and a Data Communicating Equipment (DCE) interface 32, both of which are a part of each modem. Modems 24 and 26 are each connected through the DTE interface 28 to a host bus 30, which is in turn coupled to the motherboard 16 (shown in FIG. 1). Additionally, modems 24 and 26 are each connected through the DCE interface 32 to a Time Division Multiplexing (TDM) bus 34 for transmission and reception of digital information through the T1 lines (shown in FIG. 1).

In one embodiment, such as in a back-to-back testing, a pair of modems is tested. For example, the modem 24 is designated as the 'originator' and the modem 26 is designated as the 'receiver'. Data is sent over the DCE interface 32, from the 'originator' modem 24 to the 'receiver' modem 26 and there, the received data is compared to the data that was sent for purposes of verifying its integrity. In this manner, each modem is tested extensively in that transmission and reception of data, performed during testing, is similar to that which occurs during the normal operation of the modem.

If the transfer of data is determined not to be successful, i.e. the data received by the 'receiver' modem does not match that of the originally-generated data, the 'originator' and the 'receiver' modems (modem pair) are declared 'bad' or defective and they are ultimately included within the list of 'bad' modems. Otherwise, if the received data matches the originally-generated data, the modem pair is declared 'good' and both modems are then included within the list of 'good' modems.

In FIG. 2, back-to-back modem testing is performed for 12 pairs of modems. Once a list of 'bad' and a list of 'good' modems is created, modems from the 'bad' list are individually tested against those in the 'good' list in order to determine which modem in the original 'bad' modem pair list is the one that has caused the modem pair to fail. This isolates the defective modems from the original-pair modems so as to avoid erroneously labeling a 'good' modem as 'bad'. This is a fairly time consuming process however.

Figure 4:
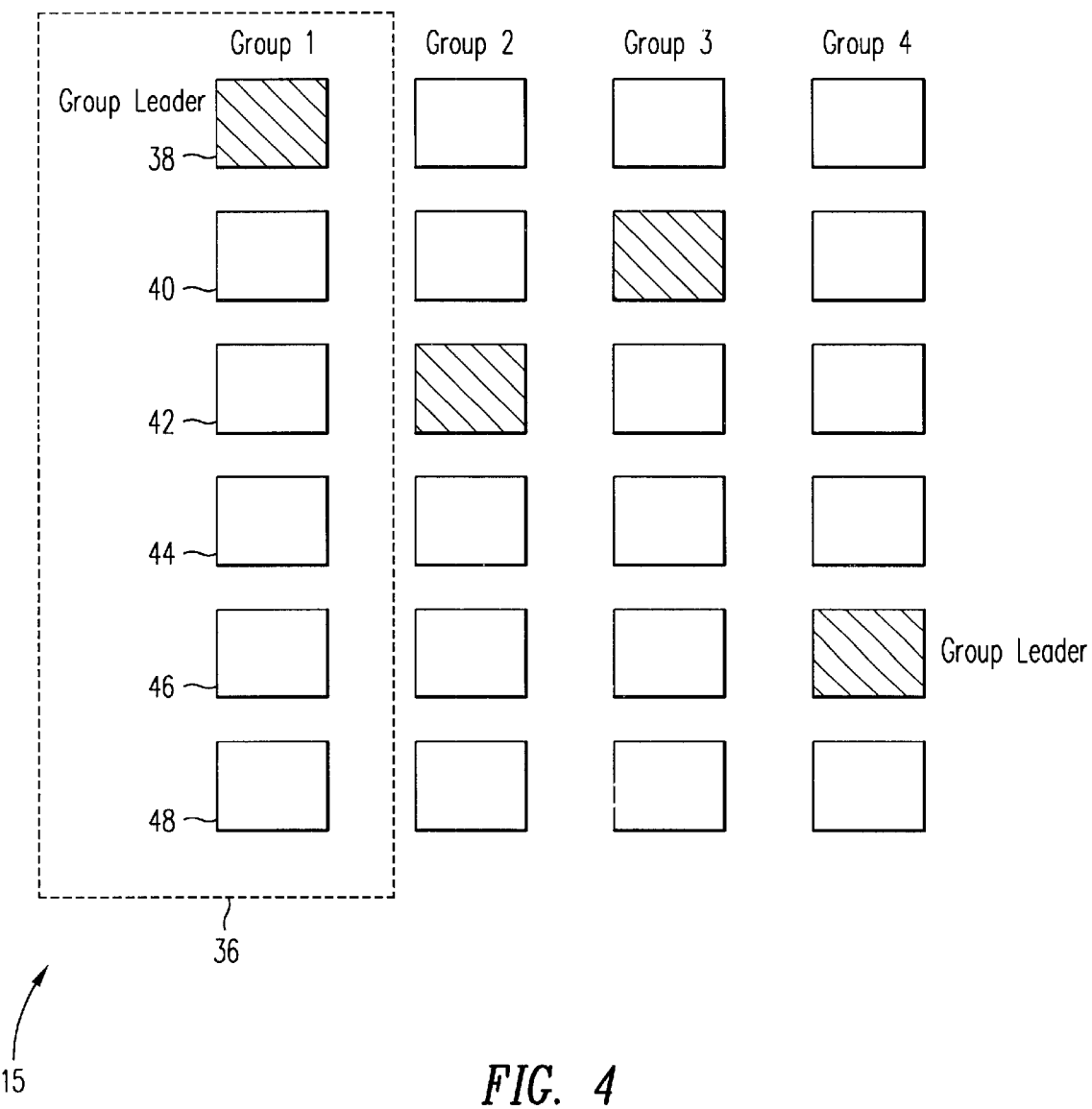
FIG. 4 illustrates a plurality of modem devices wherein a 'leader' in each group is selected in accordance with the method and apparatus described herein.

Accordingly, in another embodiment of the present invention, shown in FIG. 4, modems are shown to be divided into four groups. Within each group 36, modems are divided into groups of six. These groups can be other than 6 modems in alternative embodiments as described earlier. In the embodiment of FIG. 4 however, since a single DSP semiconductor, commercially-available in the industry, comprises of six modems, this number is being used in FIG. 4.

The four groups in FIG. 4 are numbered 1–4 and in each group 36, back-to-back tests are conducted between the first modem of each group against the remainder of the modems in that group. For example, the first modem 38 in group 1 36 is tested against the second modem 40 in group 1 36. Once this test is complete, another test is performed between the first modem 38 of group 1 and the third modem 42 of the same group. Next, the first modem 38 of group 1 36 is tested against the fourth modem 44 of group 1, followed by testing of the fifth modem 46 in group 1 36 against the first modem 38 and the sixth modem 48 against the first modem 38. When this testing is completed, the number of tests which the first modem 38 successfully passed is determined.

Once a determination is made as to the number of tests that the first modem passed, the second modem 40 in group 1 36 is tested against the remaining modems in group 1. For example, the second modem 40 in group 1 36 is tested against the third modem 42 in group 1 36 and afterwards, the second modem 40 is tested against the fourth modem 44 in group 1 36, followed by testing of the second modem 40 in group 1 36 against the fifth modem 46 of group 1, and the testing of the second modem 40 against the sixth modem 48 of group 1 36. At the end of this testing, a determination is made as to the number of tests the second modem 40 of group 1 36 passed successfully. The same kind of testing is then performed for the remainder of the modems in group 1, that is the third modem 42 is tested against the remainder of the modems in group 1 36 and a determination is made as to the number of tests that were successfully completed with respect to that modem and so on until the number of successful tests that each modem has completed is determined.

Subsequently a 'leader' is chosen among the modems of a group, such as group 1 36, as the modem with the highest number of successful tests that were completed with respect to other modems in that group. The same procedure is followed with respect to the remaining groups, i.e. groups 2–4 where in each group a modem is selected as the 'leader' in accordance with the process described with respect to group 1 hereinabove. In this respect, it is highly likely that the 'leader' chosen for each group is actually a 'good' modem, in part, due to the extensive testing performed on the modems. It is important to note that this extensive testing entails transferring of information between the modems as would be done in the normal course of operation of a digital system such as an access server. This is far more likely to reveal defects that may be present within a modem than to pass a 26-character through the modems.

Furthermore, once a 'leader' modem is selected, more extensive testing is further performed by using the 'leader' modem as a reference modem for sending and receiving 1524 bytes of digital information, in a single packet, to the other modem devices in the same group that are undergoing testing. This reliably isolates defective modems within each group and effectively overall. Additionally, Point-to-Point Protocol (PPP) testing is optionally performed between modems to verify functionality thereof.

It should be noted that the motherboard 16 (in FIG. 1), by executing a program or software code, controls the modem devices. The motherboard 16 also makes the determination as to the number of tests passed, such as described hereinabove, and it makes decisions as to the selection of a 'leader' modem.

Once these extensive testing are completed, those modems that did not make it through the testing successfully are added to the list of 'bad' modems and those that do make it are added to the list of 'good' modems. Under such extensive testing, defective modems are more likely to be detected and prevented from use thereby increasing the throughput and performance of the overall system.

The digital test information that is run on the modems resembles the information sent when the modems are in actual use. There are however differences in that in normal operation, the modems are exposed to the random nature of data transfer whereas during testing, a predetermined pattern, such as in the form of 26 characters or 1524 bytes are employed, which lacks the randomness of an actual data transfer. Nevertheless, this technique for testing has provided a reliable way of identifying modems which are operationally sound.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What I claim is:

1. A digital system for use in a packet switching network including:

a processing unit; and a plurality of modem devices coupled to said processing unit for transferring digital information between a transmission link and communication equipment, the plurality of modems being organized into one or more groups of modems wherein within each group, a modem is tested relative to each of the remaining modems in the same group, a count is maintained for the number of tested modem devices that have passed the test for each of the modem devices within a group, based upon the count, said processing unit for determining a 'leader' modem device, the 'leader' modem device having the highest number of successful tests within each group, said processing unit for further testing the modems of each group relative to the 'leader' modem within the respective group, and for isolating those modem devices within each group that failed the further testing relative to the 'leader' modem during operation of the digital system.

2. A digital system as recited in claim 1 wherein said processing unit is a motherboard device.

3. A digital system as recited in claim 1 further comprising modem boards including said plurality of modem devices, said modem boards being coupled to said processing unit for transferring digital information therebetween.

4. A digital system as recited in claim 1 wherein each of said groups of modems include six modem devices.

5. A digital system as recited in claim 1 further comprising a plurality of semiconductor devices, each semiconductor device including all of the modem devices of a group.

6. A digital system as recited in claim 1 wherein the plurality of groups of modem devices comprises four groups.

7. A digital system as recited in claim 1 wherein after a modem is tested relative to the remaining modem devices within the group, a next modem device is tested relative to the remaining modem devices within the same group and thereafter a following modem device is tested relative to the remaining modem devices within the same group and so on until all of the modem devices within the group are tested.

8. An access server for use in a packet switching network including:

a processing unit; and a plurality of modems coupled to said processing unit for transferring digital information between a transmission link and communication equipment, the plurality of modems being organized into one or more groups of modems wherein, within each group, a modem is tested relative to each of the remaining modems in the same group, a count is maintained for the number of tested modem devices that have passed the test for each of the modem devices within a group, based upon the count, said processing unit for determining a 'leader' modem having the highest number of successful tests within each group, said processing unit for further testing the modems of each group relative to the 'leader' modem within the respective group, and based upon the results of the tests, the 'leader' modem for isolating defective modems from use during operation of the digital system.

9. An access server as recited in claim 8 wherein said processing unit is a motherboard device.

10. An access server as recited in claim 8 wherein each of said groups of modems include six modem devices.

11. An access server as recited in claim 8 further comprising a plurality of semiconductor devices, each semiconductor device including all of the modem devices of a group.

12. An access server as recited in claim 8 wherein the plurality of groups of modem devices comprises four groups.

13. An access server as recited in claim 8 wherein after a modem is tested relative to the remaining modem devices within the group, a next modem device is tested relative to the remaining modem devices within the same group and thereafter a following modem device is tested relative to the remaining modem devices within the same group and so on until all of the modem devices within the group are tested.

14. A method for testing used in a digital system employing packet switching networking having a plurality of modem devices coupled to a processing unit for operation of the modem devices, comprising:

organizing the plurality of modem devices into one or more groups;

within each group, testing a plurality of modem devices relative to the other modem devices in the same group;

maintaining a count of the number of tests passed by each of the plurality of tested modem devices within a group;

based upon the count, determining a 'leader' modem having the highest number of successful tests within each group;

further testing the modems of each group relative to the 'leader' modem within the respective group; and isolating those modem devices within each group that failed the further testing relative to the 'leader' modem during operation of the digital system.

15. A method for testing as recited in claim 14 further comprising performing Point-to-Point Protocol testing on the 'leader' modem device of each group and the remaining modem devices within the same group for further verification of the modem devices of the groups.

16. A method for testing as recited in claim 14 wherein after the step of testing a modem device relative to the other modem devices, testing a next modem device relative to the remaining modem devices within the same group and thereafter testing a following modem device relative to the remaining modem devices within the same group and so on until all of the modem devices within the group are tested.

\* \* \* \* \*